Patented May 16, 1944

2,349,049

UNITED STATES PATENT OFFICE 2,349,049

SALT WATER DRILLING MUD

Eldon A. Means, Wichita, Kans., assignor to Lubri-Gel Products Company, McCracken, Kans., a copartnership of Kansas No Drawing. Application August 3, 1940, Serial No. 351,188

1 Claim. (Cl. 252—8.5)

The invention here disclosed relates to the drilling of oil and gas wells, particularly where salt water is encountered.

Bentonites and clays have long been used for making up drilling muds. It is well-known that the salt water encountered in these wells has a deleterious effect upon such drilling muds. Various attempts have been made to nullify the effects of salt water, as by the use of protective colloids and other aids. These however have definite limitations. As concentration of salt increases as it frequently does in the deeper wells, these colloids and the like, fail to protect the fluid and precipitation or flocculation of the suspended material results. Such flocculation of the fluid is often disastrous by causing the drill pipe to stick and the hole to cave in, with resultant loss of equipment.

It has long been known that there is a relation between the base exchange of clays and the stability of their suspensions in the electrolyte solutions. Based upon this fact, some of the zeolites have been used for drilling fluids, with gain in suspendibility, but this advantage has been offset by their greater porosity and because of which such materials do not build wall in the hole as well as desired.

Objects of the present invention are to provide a process and a drilling fluid which will overcome the difficulties resulting from drilling wells in extreme salt conditions.

Attainment of these objects is effected by employment of a special clay and the compounding and use of a special drilling fluid.

The principle involved, so far as understood at this time, is that the silica portion of the particles of this clay forms a permeable membrane across which boundary ions may pass. If there are no ions at the inside or if the ions on the inside are easily hydratable and/or exchangeable with difficultly hydratable ions on the outside, the existence of ions at the outside causes penetration and disruption of the electrical balance of the colloid, thus creating precipitation or flocculation. This is believed to be the result following use of bentonite drilling fluids. If, on the other hand, there are sufficient ions of the right kind on the inside, an equilibrium is established, so that the presence of ions on the outside does not disturb the electrical balance and hence a minimum precipitation or flocculation occurs.

The material employed in the present invention is a clay containing the necessary ions within its structure, such that when mechanically dispersed in salt water, it forms a stable suspension and builds a satisfactory wall in drilling operations. This material is not bentonite, because it does not contain 75% beidellite or montmorillonite, nor is it a zeolite. It is a clay having the desirable properties outlined. The differentiation between clay and zeolites or permutites is expressed by Harry B. Weiser, Professor of Chemistry at the Rice Institute in Vol. III, The Colloidal Salts Inorganic Colloid Chemistry, published by John Wiley & Sons, New York, 1938, as follows:

"Although a comparison of the exchange adsorption curves for clays and permutites would indicate an analogous behavior, the two classes of substances are really quite different in certain respects: The permutites are feebly crystalline or amorphous, and have a loose structure from which practically all their cations may be readily replaced by neutral salt solutions; the clays are definitely crystalline, the structure is less porous, and only a part of the bases present are readily replaced by salt solutions. The maximum exchange capacity of a permutite may be as high as 400–500 milli-equivalents per 100 g. (m. eq./100 g.) depending on the method of preparation, whereas for unground soil colloids and bentonite it is seldom more than 100 m. eq./100 g. and usually much less. The base-exchange capacity of permutites is altered but little by grinding whereas that of the soil colloids may be increased greatly by reducing the size of the individual particles." (pages 391–393.)

The properties heretofore sought in clays for making up drilling muds have been such as would render the same immediately or automatically suspendible. The trend of the art has been always toward more easily suspendible materials. Apparently it has not been realized that this property makes such clays unsuitable for salt water drilling, for self-suspendibility and swelling in water follow from and are due to the existence of hydratable ions within the silicate sheets of the clay.

The clay of the present invention is not of itself immediately suspendible but on the contrary, requires that it be mechanically dispersed to render it suspendible. The particle size as it exists is so large that it does not immediately become dispersed, for instance as do the bentonites.

The porosity of this clay is so low that it is not penetrated by the water and hence must be mechanically dispersed. This may be accomplished by passing the material through a colloid mill or homogenizer. A jet through which the fluid is pumped at high velocity provides a convenient means for the purpose and serves in the field as a practical means for reducing the material to a fluid suitable for salt water drilling purposes.

While other clays may be found suited to the purpose, at the present time it is preferred to use a clay found in Rush County, Kansas, near the town of McCracken. This clay has the following properties:

The color varies from yellow to blue. It has a high zeta potential and base exchange properties as measured by electrical migration of the suspension and freezing point of the pure water suspension.

As a typical analysis, the following is given:

|  | Per cent |
|---|---|
| Silicon dioxide | 60.48 |
| Aluminum oxide | 16.7 |
| Iron oxide | 6.1 |
| Calcium oxide | Nil or trace |
| Magnesium oxide | Nil or trace |
| Water | 10.6 |
| Alkalies as sodium oxide (by difference) | 6.12 |
| Freezing point (as compared to water 2.920) | 2.889 |

A typical salt water drilling fluid, under this invention, may be made up by suspending approximately 8% by weight of the atmospheric dry material in water, either salt or fresh. Salt water is preferred because it does not extract any of the adsorbed ions present in the material. Suspension is accomplished in the example under consideration, by feeding the material through a hopper into a water line going to the mud pit close to the suction of the pump.

The material is then circulated through the jet, that is, the nozzle usually referred to as the gun or shotgun, such as heretofore used simply for stirring or agitating the material used in the pit and this circulation is continued until the clay is thoroughly and substantially uniformly suspended. This jet in the present invention is employed to disperse the material by decreasing the particle size.

Practical use in the field has shown that the material described provides a satisfactory drilling fluid in concentrations of salt water far beyond those where present drilling fluids are at all practical. Its wall building ability is such as to repair the damage to walls by salt water, where fresh water muds have preceded its use.

An example of a strong, concentrated salt water such as encountered in drilling oil and gas wells and with which the present invention is particularly effective was substantially as follows:

| Sodium chloride | 86,000 |
|---|---|
| Magnesium chloride | 1,422 |
| Calcium chloride | 6,940 |
| Calcium sulphate | 7 |
| Calcium bicarbonate | 10₃ |

The percentages of these compounds varies, with the sodium chloride constituting the greater percentage. The solids may vary from 20,000 parts per million to 200,000. In drilling through actual salt beds, the total solids may approa[ch] saturation of sodium chloride. The salt wa[ter] encountered also may contain trace elemen[ts] such as strontium, barium, iron, nickel, copp[er] etc. The drilling fluid has proved its effectiv[e]ness under all these conditions and particula[rly] where approved fresh water drilling fluids a[nd] zeolites have failed.

Investigations have shown that clay materia[l] which will produce a good gel will not necessari[ly] make good drilling muds and that gelation ther[e]fore is not an essential of the mud. The prese[nt] invention recognizes these facts and establish[es] that gelation is not an essential, so long as go[od] suspendibility is obtained, as it is, in the prese[nt] disclosure, through the dispersion effected by t[he] forceful jetting described.

While the mechanical homogenization effecte[d] by jetting the clay at high velocity has been foun[d] most practical, it is possible to accomplish th[e] same dispersion by pumping the clay contain[ing] fluid through a jet or jets of proper siz[e] provided in the drill bit.

The clays employed by this invention analyze as a tetrahedron made up of a silicon tetraoxid[e] group with an oxygen centering at each corne[r] and a silicon at the center, connected with alumi[nu]m oxide group as an octahedron with an oxygen at each corner and an aluminum in the center, the dimensions coinciding with those determined by X-ray diffraction pattern. This fur[ther] there shows that the material is not bentonit[e] and that it does not contain appreciable quan[ti]ty of similar clay minerals. The mechanica[l] homogenization can be accomplished in the nor[mal] circulation system, modified to introduce the clay to the jet which then is utilized to reduce the particle size and thus effect hydration—this being distinct from the hydration accomplished in the gel type muds which act by their own ability to automatically adsorb the water.

The present invention differs from that of copending patent application Ser. 432,882 filed Feb. 28, 1942, in that it involves a salt water drilling mud made up of a high base exchange clay of the non-expanding type, mechanically dispersed to form a stable suspension in salt water, as distinguished from a pyrophyllite clay having peculiar cohesive, adhesive and ductile characteristics for controlling and preventing caving and sliding in drill holes.

What is claimed is:

The herein disclosed method of manufacturing an essentially non-gelling, flocculation resistant fluid for drilling through strongly saline formations, which comprises reducing the aggregated particle size of a non-expanding crystalline alumina, silicate mineral pyrophyllite, containing adsorbed sodium ions, by passing said mineral, suspended in water, through a mechanical homogenizer in the nature of a high pressure jet and under velocity sufficient to effect reduction of the particle size.

ELDON A. MEANS.